(12) United States Patent
Ertel et al.

(10) Patent No.: US 7,664,985 B2
(45) Date of Patent: Feb. 16, 2010

(54) WATCHDOG SYSTEM IN A DISTRIBUTED COMPUTERIZED APPLICATION ENVIRONMENT

(75) Inventors: Emilian Ertel, Nürnberg (DE); Michael Lerch, Nürnberg (DE); Falk Tintemann, Oesdorf (DE)

(73) Assignee: Siemens Aktiengesellschaft, Munich (DE)

( * ) Notice: Subject to any disclaimer, the term of this patent is extended or adjusted under 35 U.S.C. 154(b) by 426 days.

(21) Appl. No.: 11/442,080

(22) Filed: May 25, 2006

(65) Prior Publication Data

US 2006/0288199 A1  Dec. 21, 2006

(30) Foreign Application Priority Data

May 27, 2005 (DE) ........................ 10 2005 024 327

(51) Int. Cl.
   G06F 11/00  (2006.01)
   G06F 11/07  (2006.01)

(52) U.S. Cl. ............................ 714/15; 714/32; 714/38; 714/39

(58) Field of Classification Search .................. 714/15, 714/20, 39, 32, 38
See application file for complete search history.

(56) References Cited

U.S. PATENT DOCUMENTS

| | | | |
|---|---|---|---|
| 5,715,386 A * | 2/1998 | Fulton et al. ................... | 714/38 |
| 6,026,499 A * | 2/2000 | Shirakihara et al. ........... | 714/11 |
| 6,434,532 B2 | 8/2002 | Goldband et al. | |
| 6,453,430 B1 * | 9/2002 | Singh et al. .................... | 714/47 |
| 6,516,460 B1 * | 2/2003 | Merks et al. ................. | 717/124 |
| 6,763,369 B1 * | 7/2004 | Ytuarte et al. ............... | 709/201 |
| 6,898,733 B2 * | 5/2005 | Parks et al. .................... | 714/15 |
| 6,938,255 B1 * | 8/2005 | Willems et al. ............. | 718/104 |
| 7,089,450 B2 * | 8/2006 | Anderson et al. ............. | 714/15 |
| 7,490,317 B1 * | 2/2009 | Hahn et al. .................. | 717/121 |
| 2002/0087914 A1 * | 7/2002 | Sarra et al. ..................... | 714/15 |

FOREIGN PATENT DOCUMENTS

| DE | 196 01 660 A1 | 7/1997 |
|---|---|---|
| KR | 2001 0048294 A | 11/1999 |
| KR | 2001 0069467 A | 3/2001 |

OTHER PUBLICATIONS

Patent Abstracts of Japan Publication No. 10326208 A, for Japanese Application 10064852, Filed Mar. 16, 1998, Published Dec. 8, 1998.

* cited by examiner

Primary Examiner—Scott T Baderman
Assistant Examiner—Joseph Schell
(74) Attorney, Agent, or Firm—Schiff Hardin LLP

(57) ABSTRACT

In a method and a device for monitoring and reestablishment of a number of processes in a distributed application environment, wherein each process is associated with a process group and all processes of a process group are functionally dependent on one another, a process can be automatically excepted from the monitoring and automatically admitted again into the monitoring. All processes of a process group are automatically monitored and, in the event that a termination is identified, all processes in the process group are automatically restarted.

11 Claims, 3 Drawing Sheets

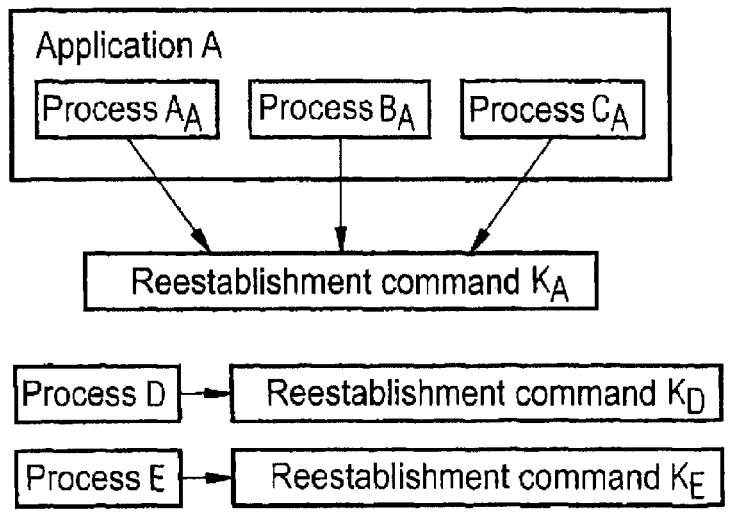
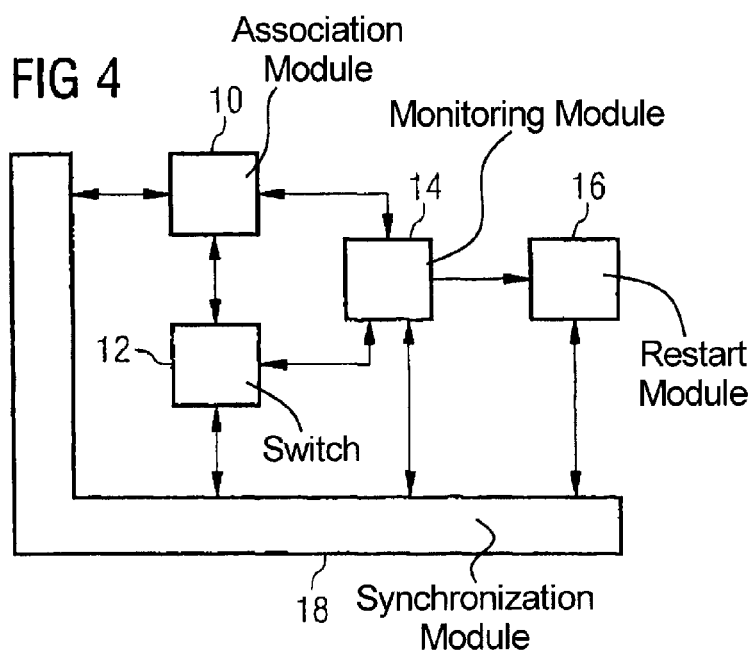

WATCHDOG SYSTEM IN A DISTRIBUTED COMPUTERIZED APPLICATION ENVIRONMENT

BACKGROUND OF THE INVENTION

1. Field of the Invention

The present invention is in the field of process monitoring and reestablishment (restarting) in the event that a process termination has occurred.

2. Description of the Prior Art

As used herein "process" means any process and event that—from an information technology viewpoint—is executed on a computer, a computer network and/or on associated peripheral apparatuses or other connected apparatuses. An application can thus trigger a number of processes. The user typically does not take notice of the invocation or the execution of the underlying processes. For example, if a text processing application is executed, it is thus possible for this application to invoke a process that concerns the printer driver and printer controller and executes processes on the CPU, and possibly even further processes that control access to network components.

In a complex application environment, there are normally a number of applications that are possibly functionally attached to one another (for example via calls) and thus exhibit interdependencies (in terms of process technology). If one such process must be terminated, the following problem issues can arise:

Consecutive faults (inherited errors; subsequent errors) can occur upon a cancellation (abort) of a process when, due to the dependency between the individual processes, not only is the restart of the one failed process necessary, but rather a restart strategy for multiple processes is necessary. This is the case when the failure of the one process results in failures of other processes.

Due to the interdependencies, it is often necessary to reestablish or to restart the respective processes in a predetermined order. This order of the restart of the respective processes cannot be resolved without a reestablishment strategy on a superordinate level that takes into account dependencies among the processes.

A further problem with reestablishment processes is that, although in principle all processes should be monitored for failures, there are exceptional situations in which individual or multiple selected processes should be excluded from the monitoring and reestablishment. This can particularly be the case when a process undergoes maintenance. Moreover, it is possible that, after the first-time failure of the process, a repeated restarting of this process has been attempted, but without success. The restart process is then terminated after a specific number of attempts and the presence of a systematic error is assumed that must first be remedied by the use of further recovery measures. In this case it is reasonable to except this process not from the monitoring, but rather at least from the reestablishment. In known systems in the prior art, a large source of errors occurs when a (normally manually) excepted process also is excepted from the monitoring process. It was previously necessary that, after the completion of the maintenance process, such a (deactivated) process would have to be specifically introduced again into the monitoring via an active step by the system administrator. If this active re-insertion of a manually-excepted process is forgotten, a security gap exists and the process remains unmonitored. This can lead to severe consecutive faults.

Central monitoring of computer-based units or computers in a network via the use of agents or log files is known in the prior art.

JP10326208 discloses an error correction system in which a number of components are likewise monitored. An error analysis and a corresponding error correction are executed for each component.

EP920155 discloses a monitoring system for a number of computer agents that are connected to a central station via a network. The individual agents communicate errors to the central station. It is possible for the central station also to analyze errors that, for example, concern network errors or communication errors. The status of each number of agents is additionally processed.

SUMMARY OF THE INVENTION

An object of the present invention is to overcome the disadvantages described above associated with the methods and devices according to the prior art, and to improve these methods and devices. In particular, error sources should be executed in which the process of the monitoring is further automated. Moreover, a more flexible control of the monitoring and reestablishment process should be possible so that further system requirements can be taken into account without having to impair the quality of the monitoring and reestablishment process.

This object is achieved by a method and an apparatus for monitoring and reestablishment of a number of processes in a distributed application environment, wherein each process is associated with a process group, the process group being defined to include all processes that are at least functionally dependent on one another, and wherein at least one process can be temporarily excepted from the method (in particular the reestablishment) when a configurable deactivation condition is fulfilled, and wherein the deactivation condition is monitored such that the process is automatically reincorporated into the process of the reestablishment as soon as the deactivation condition is no longer satisfied. The following method steps are executed for all or for selected process groups that do not contain a process for which the deactivation condition applies, monitoring of all processes of a process group for termination or for an error (or failure) and in the event that a termination has been identified and in the event that no process of the process group satisfies the deactivation condition, reestablishment of all processes in the process group by execution of one restart command, and synchronization of commands that are specified to execute and/or to control the monitoring and reestablishment process and should be executed in the same process group.

The primary field of application of the invention is in the field of medical-clinical applications that are predominantly used in a hospital environment. These are in particular PACS systems (Picture Archiving and Communication System) and/or RIS systems (Radiology Information Systems). The associated applications are normally connected with one another via a network and access a number of standard applications (for example text processing, table calculation, etc.). However, it is likewise possible to apply the present invention to other application environments.

In order to take into account the dependencies between the processes that are in particular caused by the respective interprocess communication, each process to be monitored is inventively, distinctly associated with a process group. A process group is defined by all processes contained therein exhibit (from the point of view of the system) mutual or one-sided (for example calls) interdependencies or dependencies. These are normally functional dependencies, thus when one process requires the result of another process for the further processing. It is also within the framework of the invention to take into account interdependencies. This has the advantage that "side effects" of an individual process termination can also be automatically considered. For example, if a process for a communication connection fails and another process accesses this communication connection process, according to the invention it is then ensured that both processes are contained in the same process group since they are functionally dependent on one another. In the previous methods, problems can result when only one process reports a process crash but other processes are indirectly affected that output no such message. According to the invention, all other processes affected by this (thus the processes in the same process group) are taken into account, and a systematic restart of the process environment can be initiated.

An important feature of the present invention is that the entire monitoring and reestablishment method can be used significantly more flexibly, and thus possibilities are provided that more appropriately adapt the process to the respective system conditions. Particularly in the medical clinic environment, it is an indispensable requirement that the respective processes; be reliably subjected to a clinical maintenance. A system administrator normally executes this. When a process is serviced, in some cases it may be necessary the process itself is thereby not active and that other applications thus cannot access it. In this case, it makes no sense to include this process in the cyclical monitoring and reestablishment process since this would necessarily lead to a flood of unnecessary error messages. According to the invention, it is therefore provided to introduce specific exception conditions or deactivation conditions. In these deactivation conditions it is defined in which cases a process is excepted from the reestablishment process and thus should be deactivated. So that errors due to incorrect operation can now be reliably excluded, it is inventively provided that a process for which the deactivation condition is satisfied, and which has thus been excepted from the reestablishment process, does not fall through the monitoring net. The deactivation condition is therefore continuously monitored. As soon as it is established that the deactivation condition is no longer satisfied and that no further requirements to except the process from the monitoring and/or from the reestablishment are also satisfied, this process is automatically inserted again into the method. A significant advantage of this procedure is that errors can be safely avoided that arise in the event that a user completely forgets the manual and explicitly required retransfer of a previously-excepted process. The reliability of the monitoring system (and with this indirectly also of the system to be monitored) thus can be distinctly increased.

In a preferred embodiment of the invention, the processes are monitored for termination or, respectively, failure. As an alternative, it is also possible to monitor the process for less extensive (serious) errors.

A process for which an exception condition applies is in fact normally excepted from the reestablishment process, but not from the monitoring process. This can increase the security of the system. Alternatively, it is possible to except the deactivated process both from the reestablishment and from the monitoring.

The inventive steps do not have to be executed at the same time or in immediate succession; rather, it is likewise possible to temporally distribute the steps. It is in reasonable to already execute the definition of process groups and the association of the processes with a process group in advance.

The core of the inventive solution is the actual monitoring process. For this, the method steps below are executed for all process that should be monitored. Due to the mutual interdependencies of the processes in a process group, a presetting can be made that designates not only which process, for which the deactivation condition applies, is to be excluded from the actual restart, but also designates all other processes in the same process group therewith that are also to be excluded from this reestablishment task since they would inevitably run into an error. However, It is likewise possible to design this procedure differently by suitable presets. In the preferred embodiment, the following method steps are executed:

1. Cyclical monitoring of all processes for failure or, respectively, process termination
2. In the event that a failure has been identified:
   Reestablishment of all processes in the process group (thus not only the failed processes but rather also all those processes that depend on it) via execution of one respective restart command with regard to the processes and in a preconfigurable order, and
3. Synchronization of monitoring and reestablishment commands in the process group.

These are normally commands that are executed for the purposes of the monitoring and reestablishment of the processes, the commands "START", "STOP" and/or "RESTART". It is also within the scope of the invention to provide additional or alternative commands that are relevant for the monitoring and/or the reestablishment of a terminated process.

If a process is currently present in the monitoring analysis, it can lead to errors in the monitoring process when other commands are likewise to be executed on the processes in the same process group in this time interval. This is particularly the case when the monitoring of a process requires the execution of at least one command. It is therefore necessary in accordance with the invention that the respective supervision and monitoring commands are synchronized. In a very simple embodiment of the invention, this synchronization is foregone. Only the following method steps are then executed:
   monitoring and
   reestablishment.

By the grouping of the processes in a process group, possible in accordance with the invention to take into account a REBOOT or RESTART strategy for the order of the restart of the individual processes in the group. In particular it is previously configured in which order the respective processes of a process group should be started given an error of one process in this group. As an alternative, in critical applications it is possible to permit this order to be adaptively determined, in particular via a corresponding user input. Moreover, the RESTART strategy can also include the pre-configuration of specific parameters for the starting of the respective processes.

From the method according to the prior art it is known to use what is known as a monitoring list, in which it is defined at each point in time which processes are participating in the monitoring and which are not contained therein. The direction of this list (thus in particular the insertion and deletion of processes into or from this list) previously ensued manually. This is a potential error source. A significant advantage of the inventive method is that this list is compiled automatically. In particular the insertion of processes into the list (i.e. the connection of the processes in the monitoring process) ensues automatically.

The method is typically executed centrally, such as by the operation of a system administrator. This allows specific monitoring strategies to be implemented that take into account the interaction of the processes. This is not possible given monitoring mechanisms that only singularly consider the individual processes to be monitored.

The actual monitoring is normally executed cyclically at time intervals that can be preset. It is likewise alternatively or additionally possible to trigger the monitoring when specific events exist. For example, scenarios are conceivable that take into account that the monitoring should ensue in close detail before a very critical usage of the application.

The definition of the criteria for the formation of a process group is a significant feature of the invention. In order to optimally cover all scenarios, it is therefore necessary that respectively new application components to be incorporated in the system are communicated to the inventive units so that newly-arising process dependencies can also be automatically accounted for. For this purpose, an editor is provided that enables the system administrator to define the dependencies from the point of view of the inter-process communication. In alternative embodiments of the invention, further criteria that exceed the pure analysis of the dependencies and, for example, take into account workflows in other computer systems, can be added or connected via corresponding fields on the user interface (a possibility here would be the crash of a remotely-situated databank which can be accessed).

All steps of the method described above are preferably automatically executed. It is likewise within the scope of the invention to design the method to be semi-automatic such that only a selection of the method steps is executed automatically.

A result and/or intermediate result of the inventive solution is normally detected, stored and/or—via a corresponding user interface—displayed. Particularly the monitoring list is automatically displayed as soon as changes occur therein. In the event that a process crash has been identified, this is displayed (as is known in the prior art) and the suitable recovery measures are initiated.

The embodiments of the method described above can also be implemented by a computer program product, namely a computer-readable medium encoded with program code that causes the computer to implement the inventive method described above.

The individual components of the method described above can be executed as a saleable unit and that the remaining components can be executed as another saleable unit—known as a distributed system.

The above object also is achieved by a product for monitoring and reestablishment of a number of processes in a distributed application environment, in particular monitoring and reestablishment of medical-clinical applications, with:

at least one association module that is designated to associate a process group with each process, with a process group being defined in that all processes of a process group are functionally dependent on one another at least one switch that is designated to temporarily deactivate and activate processes for the reestablishment, whereby the switch is based on a configurable deactivation condition, and whereby the deactivation condition is monitored such that the process is automatically incorporated again into the reestablishment as soon as the deactivation condition is no longer fulfilled at least one monitoring module that is designated to monitor all processes of a process group for failure at least one restart module that is designated to reestablish all processes in the process group via execution of one respective restart command in the event that a failure has been identified and at least one synchronization module that is designated to synchronize all monitoring commands in the same process group,

DESCRIPTION OF THE DRAWINGS

FIG. 1 is an overview representation of an inventive association of processes with a process group.

FIG. 4 is a block diagram showing the inventive modules according to a preferred embodiment of the invention.

DESCRIPTION OF THE PREFERRED EMBODIMENTS

Figure 2:
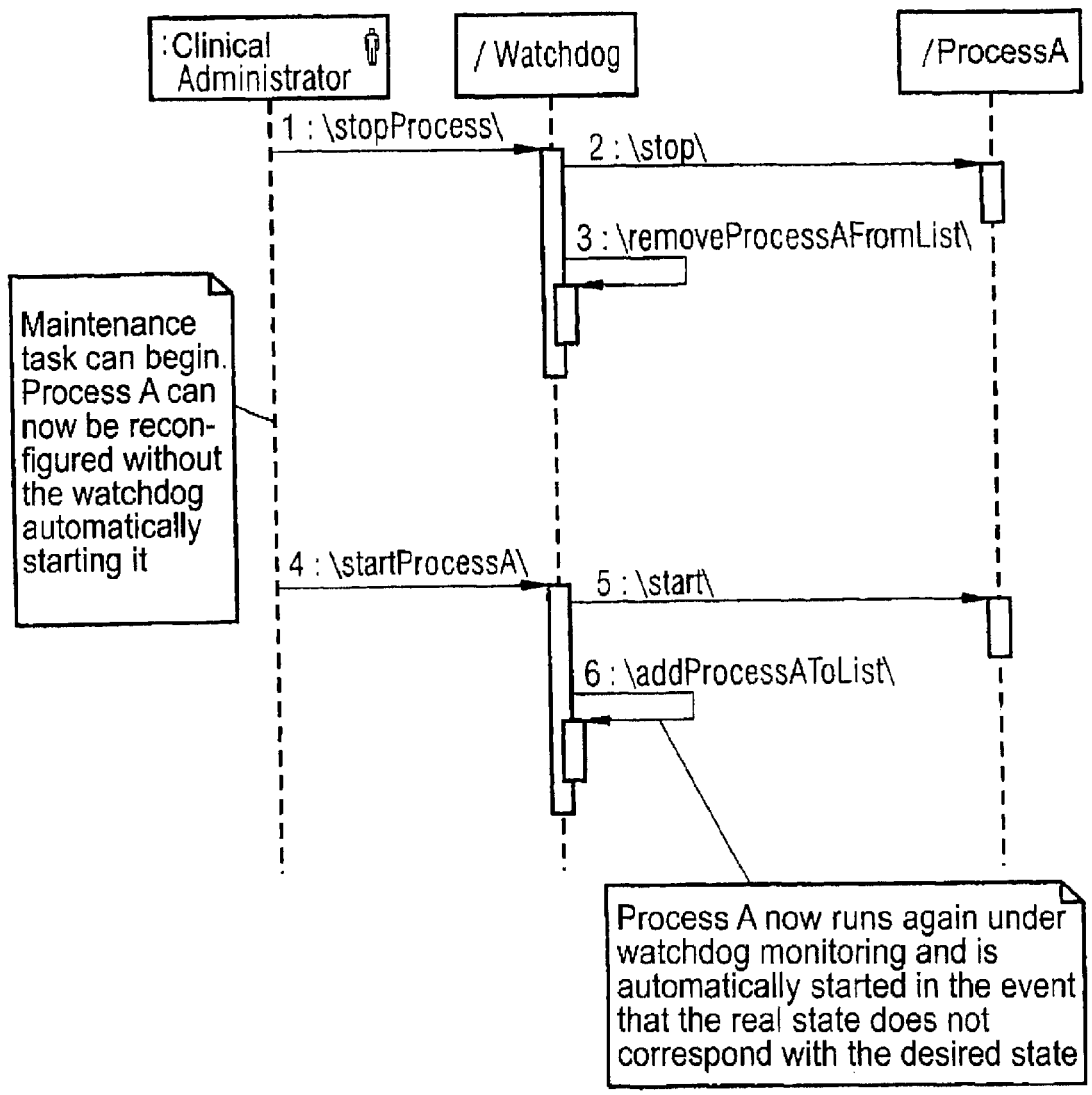
FIG. 2 is an overview representation of an inventive workflow according to a preferred embodiment.

The primary field of application of the present application is network systems that include a number of applications and that are in particular designed for the medical clinic environment. It is also within the scope of the invention to likewise apply the solution to other technical fields.

As used herein "process" means all embodiments of program codes or of program code segments and of hardware components. The term is thus very general and encompasses both software-based and hardware-based components.

As can be seen from FIG. 1, an application includes a number of processes. What is significant in the definition of the processes is that, from the viewpoint of the user, the processes do not necessarily belong to the respective application, but rather that the processes belong to the respective application from the viewpoint of a system administrator (and thus from the viewpoint of the inter-process communication).

As shown in FIG. 1, the application A includes the processes $A_A$, $B_A$ and $C_A$. The processes can, for example, be a printer driver, a databank access and a Bluetooth connection. Multiple processes can be associated with one application A. It is likewise possible that there are singular processes (like the processes D and E in the example of FIG. 1) that are in turn coupled with other processes.

A significant feature of the present inventive solution is to be seen in that a number of processes are combined into one process group. A process group is thereby defined by the processes located contained therein exhibiting dependencies on one another. These are in particular functional dependencies from the viewpoint of the inter-process communication. The processes that can be associated with a process group belong to a common application, but this is not necessary. In the framework of the invention it is possible to expand this definition and, alternatively or cumulatively, to allow further definitions of process groups.

It is significant for the invention that the dependencies between the individual processes are taken into account in a reestablishment command for the system. A process group thus has a single (individual) reestablishment command.

The reestablishment of a system or of a process group is typically effected via the execution of a number of restart commands in a predetermined order.

By the collection of multiple processes into one process group, it is possible to take into account a reestablishment strategy that allows for the chronological execution of the individual restart commands and their parameterization.

Especially in critical processes in the medical environment (for example in PACS systems in the field of radiology), it is frequently necessary that the individual processes not be considered singularly, since they must be started in a predefined order in the event that one of these processes is terminated (fails).

Moreover, errors should be avoided that arise from an activated watchdog mechanism getting caught in an endless loop by continuously trying to restart a process that is in a maintenance mode. In the framework of the invention, the term watchdog should be understood as a module (in the form of a device, a method or a product) that executes the monitoring and reestablishment process.

In principle, a process that is presently being serviced should be excluded from the reestablishment so that it communicates no errors to the restart procedures. In the known method in the prior art, this is ensured by the individual serviced process being manually deleted from a monitoring list. It is thereby completely excepted from the monitoring process. If the maintenance process is now concluded, it was previously necessary that this process would have to be respectively, manually inserted into the monitoring list via a special activity on the part of the administrator. This involves a high error potential, since the process can completely fall out of the monitoring net when this manual process is forgotten, the more so as a maintenance process can also extend over a long time interval, such that the individual process "falls into oblivion". It is also possible that not only maintenance commands collide with an activated watchdog mechanism, but also that other user commands can cause a misbehavior. This problem is inventively solved by a deactivation module that enables individual processes to be excluded from the reestablishment process. It is thereby essential that the conditions for such a deactivation process are clearly established and are monitored for their occurrence. These deactivation conditions are advantageously configurable. This means that it can be decided at an advanced point in time which events must be pressed or, respectively, which conditions must be fulfilled so that an individual process can be excepted from the reestablishment process. Furthermore, it can be defined under which conditions (or events) the process should be reassumed into the monitoring. These deactivation and activation conditions are automatically monitored. It can thus be ensured that a process that has been excepted at the time from the monitoring mechanism is reliably readmitted again to the monitoring without the execution of a special command and at the correct point in time.

In another embodiment, a deactivated process (thus a process for which at least one deactivation condition applies) is deactivated not only with regard to the reestablishment but also with regard to the monitoring (the method step of the monitoring in the inventive method is therewith meant). Only the deactivation condition is then checked so that the process can be automatically activated again with regard to the monitoring.

The example of FIG. 1 shows how redundant monitoring cycles can be avoided by the inventive method. For example, if the process AA is terminated, it is thus superfluous to overrun the processes BA and CA (which are functionally dependent on the process AA) with repeated and inevitably unsuccessful restart commands in this time span. This applies for the time interval in which the process AA has crashed.

As soon as the process AA thus exhibits a real state that deviates from a desired state, it is not necessary that the other processes in the same process group are monitored and/or reestablished since they are functionally dependent on the failed process AA. The other processes of the same process group are in particular excepted from all further reestablishment commands. This increases the availability of the system.

Moreover, the commands that are executed in the framework of the monitoring and reestablishment of individual processes of a process group are synchronized. This means that the execution of other commands is suppressed when at least one command is executed on a process of the same process group. The monitoring and reestablishment commands are typically start, stop and/or restart commands. As soon as a process executes one of these aforementioned commands, it is ensured that none of the other processes in the same process group accept commands until the current command has been executed to completion. The other commands for the processes of the same process group are shifted into a wait queue and executed at a later point in time, namely when all remaining processes of the process group function without error.

In principle, a process status can be registered that specifies in which state the process is currently found (for example process: starting, stopping, restarting). Moreover, it is possible to register a process group status corresponding to the respective status of the processes that belong to a process group. In the preferred embodiment of the invention, the process status can then also be queried when a command is currently executed on a process of the process group. This has the advantage that the system administrator can monitor the process environment in more detail, particularly when, for example, a restart event of a process takes multiple minutes and the monitoring method would otherwise be unnecessarily delayed.

If one of the processes A, B or C has failed in FIG. 1, the application A can thus automatically be reestablished in that a single reestablishment command KA is executed. This ensues via a script with specific calls. In the reestablishment command KA, the order for the respective restart commands for the processes A, B, C can be defined such that the entire application A can be automatically reestablished. The processes E and D are singular processes that are not coupled with other processes. Singular reestablishment commands $K_D$ and $K_E$ likewise apply for them. One advantage of the inventive solution is that an automatic reestablishment is even possible when a process has not yet sent an independent error message and, for example, would only fail at a later point in time when the functional dependency on the failed process is relevant. It is thereby possible to already safely avoid widespread damages at an early stage.

As FIG. 2 shows, the inventive watchdog mechanism is arranged as a central station in a hierarchically-superordinate plane above the respective processes and applications. The corresponding commands that are necessary in the framework of the monitoring and reestablishment are executed via the watchdog mechanism.

In the example shown in FIG. 2, the process A should be subjected to a maintenance process. The system administrator therefore initiates a stop command for the process A. The process A is therewith automatically deleted from the monitoring list and therewith withdrawn from the monitoring process. The deactivation condition is simultaneously monitored. Here the deactivation condition exists at the end of the maintenance process. It is therewith ensured that the process is automatically readmitted to the reestablishment process as soon as the deactivation condition is no longer satisfied (in this case: as soon as the maintenance process is concluded). In the meantime (thus during the maintenance work) the process is excepted from the reestablishment. This leads to the situation that unnecessary error messages of the monitoring system can be avoided that are based on the fact that cyclically-executed restart commands are necessarily unsuccessful during this time span.

In an alternative embodiment of the invention, a deregistration routine is provided. This is a routine of the process that is activated as soon as a stop command for a process is executed that is located in a process group together with other processes. The deregistration routine results in the stopped process being automatically logged off or deregistered in the other processes. The other (functionally-dependent) processes in the process group are thereby informed about the stop of the terminated process and can adaptively implement a continuation strategy. If applicable, this can result in the other processes in the process group being continued if they no longer require the activation of the terminated process, or it is possible that the other processes will be likewise stopped in the event that the functional dependency is still relevant to those other processes at this point in time.

Figure 3:
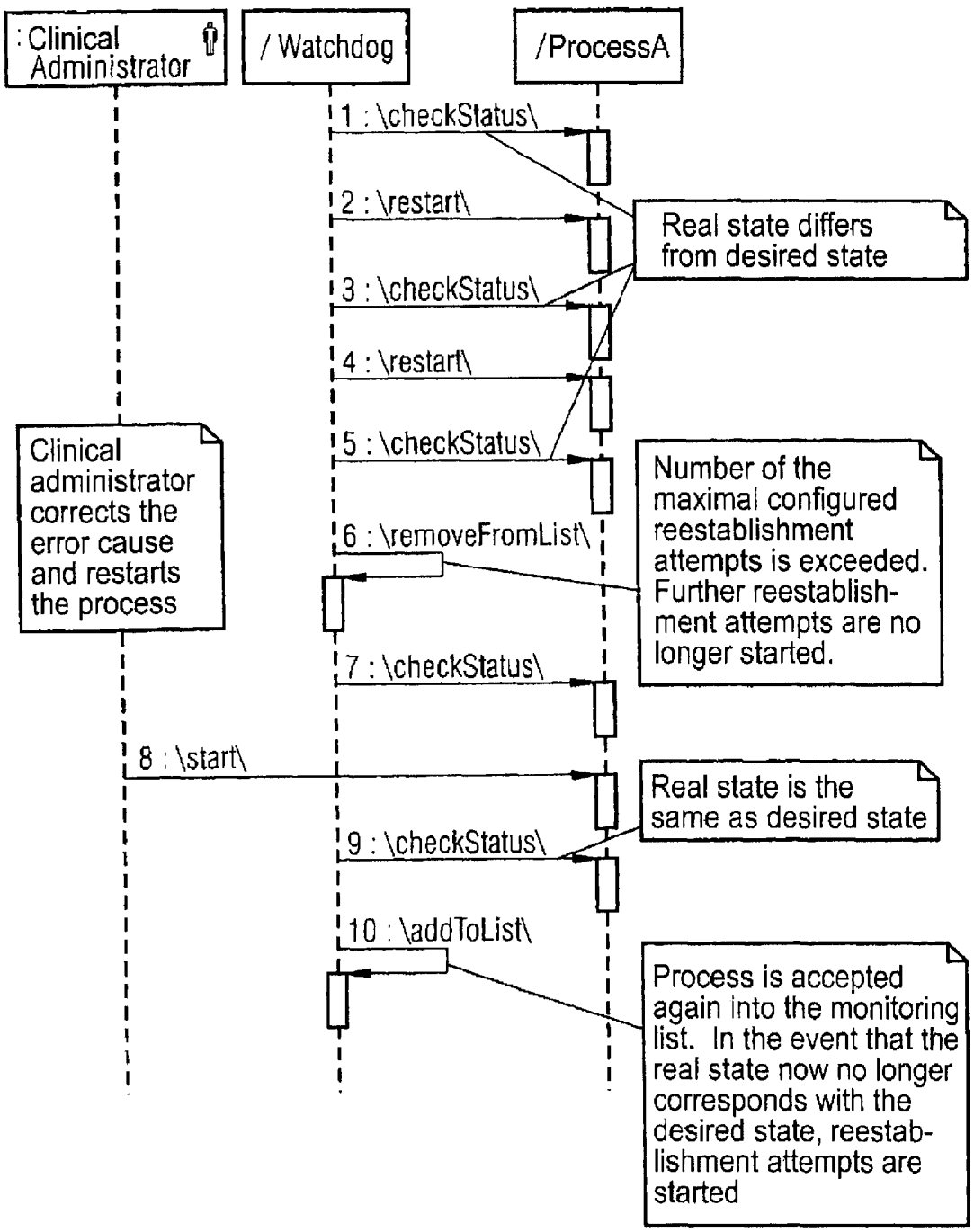
FIG. 3 is an overview representation of an inventive solution in the case of a systematic error.

In FIG. 3, an example is shown as to how the inventive watchdog mechanism behaves in the event that a systematic error exists. The term "systematic error" encompasses all of the errors for which repeated reestablishment (restart) attempts are useless. The number of the reestablishment attempts can be limited. If the number of the maximum possible reestablishment attempts is n, the class of the systematic errors encompasses all errors that cannot be resolved or remedied via n repetitions of the reestablishment attempt. In such a case, it is not reasonable for the reestablishment routine to further continue the unsuccessful attempts. It is therefore inventively provided that, after n reestablishment attempts (whereby n is configurable), a corresponding message is output to the administrator that a systematic error possibly exists. Moreover, the respective process A remains in the monitoring and is always still actively monitored by the watchdog although the process A was deleted from the monitoring list. The administrator can service the process A and correct the systematic error in parallel with this. After the error correction, the real state of the process A corresponds to its desired state. The process A is then automatically accepted into the monitoring list. This ensues without explicit action of the administrator and can therefore contribute to the freedom of the monitoring system from error.

The necessary steps in maintenance tasks can be clearly reduced and simplified via the automation of the monitoring process and the implementation of an automatic monitoring of deactivation conditions. It is thereby possible to deactivate the watchdog only for the parts or, respectively, processes that fulfill a deactivation condition, in particular that are serviced. It is not necessary to deactivate the entire system. This leads to a longer up-time or system availability and to better monitoring results.

Moreover, the inventive procedure unburdens the clinical administrator given maintenance and error-correction measures, in that the manual maintenance of a monitoring list is no longer necessary. The error quota can thereby be clearly reduced.

In a block diagram, FIG. 4 shows modules 10, 12, 14, 16, 18 according to a preferred embodiment. The inventive watchdog normally includes an association module 10, a switch 12, a monitoring module 14, a restart module 16 and a synchronization module 18.

The association module 10 associates each process with a process group. The association relation is thereby configurable. In particular it is defined such that a process group is defined in that all processes of a process group are functionally dependent on one another (and therewith interlock in the workflow environment, for example via function calls).

The switch 12 temporarily deactivates and activates processes for the reestablishment. The actuation of the switch 12 ensues automatically and is based on a configurable deactivation condition. The deactivation condition is monitored so that the process is automatically accepted again into the reestablishment as soon as the deactivation condition is no longer satisfied. The deactivation condition is normally a composite logical operator that links multiple conditions.

The monitoring module 14 monitors all processes of a process group for failure. This process is normally implemented cyclically or controlled by specific events.

The restart module 16 reestablishes all processes in the process group in the event that a failure has been identified. For this purpose, a reestablishment command is executed for one respective process group. The reestablishment command normally comprises a restart command sequence in order to restart the failed processes again in the correct order.

The synchronization module 18 synchronizes all monitoring and reestablishment commands that should be executed on processes in the same process group.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for monitoring and re-establishing a number of processes in a distributed computerized application environment, comprising the steps of:
   (a) in a computerized system in said environment, electronically defining a process group to consist of all processes from among said number of processes, that, for fault-free execution of said processes, are functionally dependent on one another at least according to a base criterion that execution of each in said process group affects execution of another process in said process group during said fault-free execution of said processes, each process in said process group being a group process;
   (b) in said computerized system, automatically electronically monitoring all group processes in said process group to identify non-execution of any of said group processes;
   (c) in said computerized system, automatically electronically reestablishing all group processes in said process group that have become unexecutable due to dependency on said non-execution of any of said group processes in said process group, by executing a series of reestablishment commands respectively for the unexecutable group processes;
   (d) in said computerized system, automatically electronically temporarily excepting any of said group processes, for which a configurable deactivation condition is fulfilled, from the reestablishment commands;
   (e) in said computerized system, automatically electronically monitoring said deactivation condition and restoring any of the excepted group processes so the restored excepted group process is eligible for said reestablishment if and when said deactivation condition is no longer satisfied, as a monitoring outcome; and
   (f) in said computerized system, automatically electronically synchronizing the respective reestablishment commands for the group processes in said process group dependent on said monitoring outcome.

2. A method as claimed in claim 1 comprising allowing a manual entry into said computerized system to configure said configurable deactivation condition.

3. A method as claimed in claim 1 comprising, in said computerized system, automatically electronically configuring a chronological sequence for execution of the respective reestablishment commands for the group processes in said process group.

4. A method as claimed in claim 1 wherein the step of defining said process group comprises generating an electronic monitoring list in said computerized system and electronically entering each group process that is in said process group into said monitoring list, and wherein the step of automatically electronically excepting a group process from reestablishment comprises automatically electronically removing that group process from said monitoring list when said deactivation condition is satisfied.

5. A method as claimed in claim 1 comprising employing a computer at a centralized location in said distributed application environment as said computerized system.

6. A method as claimed in claim 1 comprising executing steps (a)-(f) cyclically, dependent on configurable criteria entered into said computerized system.

7. A method as claimed in claim 1 comprising employing an electronic editor in said computerized system that allows flexible inclusion, according to different criteria in addition to said base criterion, of a process, from among said number of processes, in said defining of the process group.

8. A method as claimed in claim 1 comprising employing reestablishment commands in said computerized system comprising "start", "restart" and "stop".

9. A method as claimed in claim 1 wherein the step of synchronizing said monitoring and said reestablishment commands comprises permitting only one reestablishment command to be executed within a configurable time interval.

10. A method as claimed in claim 1 comprising automatically electronically recording and storing a result of execution of steps (a)-(f) by said computerized system.

11. A computerized system for monitoring and re-establishing a number of processes in a distributed computerized application environment, comprising:

a computerized association module operated by a computer to define a process group to consist of all processes, from among said number of processes, that, for fault-free execution of said processes, are functionally dependent on one another at least according to a base criterion that execution of each in said process group affects execution of another process in said process group during said fault-free execution of said processes, each process in said process group being a group process;

a computerized monitoring module connected to said association module, operated by a computer to automatically monitor all group processes in said process group to identify non-execution of any of said group processes, and to also automatically monitor a deactivation condition;

a computerized restart module operated by a computer to automatically reestablish all group processes in said process group that have become unexecutable due to dependency on said non-execution of any of said group processes in said process group, by executing a series of reestablishment commands respectively for the unexecutable group processes;

a switch controlled by said monitoring module and connected to said association module to electronically temporarily except any of said group processes, for which said configurable deactivation condition is fulfilled, from said reestablishment commands and to restore any of the excepted group processes so the restored excepted group process is eligible for said reestablishment if and when said deactivation condition is no longer satisfied, as a monitoring outcome; and a computerized synchronization module operated by a computer to automatically synchronize the respective reestablishment commands for the group processes in said process group dependent on said monitoring outcome.

* * * * *